(12) United States Patent
Kudo et al.

(10) Patent No.: US 10,630,741 B2
(45) Date of Patent: Apr. 21, 2020

(54) COMMUNICATION METHOD, STORAGE MEDIUM STORING COMMUNICATION PROGRAM, AND COMMUNICATION SYSTEM

(71) Applicant: Brother Kogyo Kabushiki Kaisha, Nagoya-shi, Aichi-ken (JP)

(72) Inventors: Yasuhiro Kudo, Ichinomiya (JP); Hiroyuki Moriguchi, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 16/255,451

(22) Filed: Jan. 23, 2019

(65) Prior Publication Data

US 2019/0306207 A1 Oct. 3, 2019

(30) Foreign Application Priority Data

Mar. 27, 2018 (JP) .................................. 2018-059138

(51) Int. Cl.
*H04L 29/06* (2006.01)
*H04L 29/08* (2006.01)

(52) U.S. Cl.
CPC ........ *H04L 65/403* (2013.01); *H04L 63/0876* (2013.01); *H04L 67/10* (2013.01); *H04L 67/32* (2013.01)

(58) Field of Classification Search
CPC ...... H04N 7/15; H04N 7/17318; H04N 7/147; H04N 21/6131; H04N 21/6181; H04N 7/152; H04N 1/00281; G06F 2203/04803; H04M 2203/5036; H04M 2203/5054; H04M 2203/5072; H04M 3/566;
(Continued)

(56) References Cited

U.S. PATENT DOCUMENTS 5,532,937 A * 7/1996 Graziano .............. H04J 3/1682
340/2.2
5,936,662 A * 8/1999 Kim ....................... H04N 7/152
348/14.09
(Continued)

FOREIGN PATENT DOCUMENTS

JP 2014-158203 A 8/2014

*Primary Examiner* — Sargon N Nano
(74) *Attorney, Agent, or Firm* — Banner & Witcoff, Ltd.

(57) ABSTRACT

A communication method includes: transmitting a transfer request and setting information from first to second server apparatus; transmitting a transfer notification from second to third server apparatus directly or through the first server apparatus; transmitting a transfer response from third to first server apparatus; receiving a first information request from the third server apparatus during a first period; transmitting, after the first period elapses, the first information request from first to second server apparatus; receiving a plurality of second information requests transmitted from the third server apparatus during a second period, and retaining the second information requests in a received order; and after the second period elapses, transmitting first setting information corresponding to the first information request from second to third server apparatus, and subsequently transmitting a plurality of second setting information corresponding to the second information requests from second to third server apparatus in a retained order.

14 Claims, 4 Drawing Sheets

(58) Field of Classification Search
CPC ............... H04M 3/568; H04M 11/06; H04M 2203/5063; H04L 12/1818; H04L 65/403; H04L 12/1813; H04Q 2213/13337
See application file for complete search history.

(56) References Cited

U.S. PATENT DOCUMENTS

| | | | |
|---|---|---|---|
| 10,079,963 B1* | 9/2018 | Liu | H04N 21/4524 |
| 2004/0107284 A1* | 6/2004 | Koperda | H04J 3/1694 |
| | | | 709/229 |
| 2004/0199580 A1* | 10/2004 | Zhakov | H04L 12/1818 |
| | | | 709/204 |
| 2005/0108328 A1* | 5/2005 | Berkeland | H04L 12/1822 |
| | | | 709/204 |
| 2008/0065998 A1* | 3/2008 | Brown | H04M 3/56 |
| | | | 715/755 |
| 2008/0246834 A1* | 10/2008 | Lunde | H04N 7/142 |
| | | | 348/14.09 |
| 2011/0141218 A1* | 6/2011 | Stancato | G06F 21/10 |
| | | | 348/14.01 |
| 2013/0091526 A1* | 4/2013 | Iyer | H04L 65/608 |
| | | | 725/62 |
| 2014/0049594 A1* | 2/2014 | Davis | H04M 3/567 |
| | | | 348/14.08 |
| 2014/0139609 A1* | 5/2014 | Lu | G10L 21/0208 |
| | | | 348/14.03 |
| 2016/0212273 A1* | 7/2016 | Tsypnyatov | H04M 3/562 |
| 2019/0361694 A1* | 11/2019 | Gordon | G06F 9/543 |

\* cited by examiner

COMMUNICATION METHOD, STORAGE MEDIUM STORING COMMUNICATION PROGRAM, AND COMMUNICATION SYSTEM

CROSS REFERENCE TO RELATED APPLICATIONS

This application claims priority from Japanese Patent Application No. 2018-059138 filed Mar. 27, 2018. The entire content of the priority application is incorporated herein by reference.

TECHNICAL FIELD

This disclosure relates to a communication method, a storage medium storing a communication program, and a communication system.

BACKGROUND

Various communication methods have been suggested to perform a teleconference between a server apparatus and a terminal apparatus connected through a network. A multipoint conference system is suggested. The multipoint conference system includes a plurality of MCUs, a resource management server, and a plurality of terminals. The respective MCUs and the plurality of terminals are connected to networks for the respective areas (hereinafter referred to as "area network"). The respective MCUs control a multipoint conference (hereinafter simply referred to as "conference") by transferring packets transmitted and received among the plurality of terminals. The resource management server performs resource management on each of the plurality of MCUs. For example, when a first MCU controlling a specific conference has insufficient resources, request information is transmitted to the resource management server. Based on the request information, the resource management server extracts a second MCU as a substitute and notifies the second MCU. The second MCU transmits the address of the second MCU to a plurality of terminals participating in the conference controlled by the first MCU and switches a connection destination to continue the conference.

SUMMARY

According to one aspect, this specification discloses a communication method performed by a plurality of server apparatuses configured to control communication among a plurality of terminal apparatuses. The plurality of server apparatuses includes a first server apparatus, a second server apparatus, and a third server apparatus different from one another. The first server apparatus has master authority for managing setting information relating to the communication. The communication method includes: transmitting a transfer request and the setting information from the first server apparatus to the second server apparatus, the transfer request being for requesting that the master authority is transferred from the first server apparatus to the second server apparatus; after the second server apparatus receives the transfer request and the setting information, transmitting a transfer notification from the second server apparatus to the third server apparatus directly or through the first server apparatus, the transfer notification being for notifying that the master authority is transferred from the first server apparatus to the second server apparatus; in response to receiving the transfer notification by the third server apparatus, transmitting a transfer response from the third server apparatus to the first server apparatus; receiving a first information request from the third server apparatus during a first period that is a period after the first server apparatus transmits the transfer request and the setting information to the second server apparatus and before the first server apparatus receives the transfer response from the third server apparatus; in response to receiving the transfer response by the first server apparatus, transmitting, after the first period elapses, the first information request from the first server apparatus to the second server apparatus; receiving a plurality of second information requests transmitted from the third server apparatus during a second period that is a period after the second server apparatus transmits the transfer notification to the third server apparatus and before the second server apparatus receives the first information request from the first server apparatus, and retaining the plurality of second information requests in a received order; and after the second period elapses, transmitting first setting information corresponding to the first information request from the second server apparatus to the third server apparatus, and subsequently transmitting a plurality of second setting information corresponding to the plurality of second information requests from the second server apparatus to the third server apparatus in an order in which the corresponding plurality of second information requests is retained.

According to another aspect, this specification also discloses a non-transitory computer-readable storage medium storing a communication program executable on a computer of a particular server apparatus in a plurality of server apparatuses configured to control communication among a plurality of terminal apparatuses. The plurality of server apparatuses includes a first server apparatus, a second server apparatus serving as the particular server apparatus, and a third server apparatus different from one another. The first server apparatus has master authority for managing setting information relating to the communication. The communication program causes, when executed, the second server apparatus to perform operations including: receiving a transfer request and the setting information transmitted from the first server apparatus, the transfer request being for requesting that the master authority is transferred from the first server apparatus to the second server apparatus; in response to receiving the transfer request and the setting information, transmitting a transfer notification to the third server apparatus directly or through the first server apparatus, the transfer notification being for notifying that the master authority is transferred from the first server apparatus to the second server apparatus; when the first server apparatus receives a first information request from the third server apparatus during a first period that is a period after the first server apparatus transmits the transfer request and the setting information to the second server apparatus and before the first server apparatus receives a transfer response from the third server apparatus in response to the transfer notification, receiving a plurality of second information requests transmitted from the third server apparatus during a second period that is a period after the second server apparatus transmits the transfer notification to the third server apparatus and before the second server apparatus receives the first information request from the first server apparatus, and retaining the plurality of second information requests in a received order; and after the second period elapses, transmitting first setting information corresponding to the first information request to the third server apparatus, and subsequently transmitting a plurality of second setting information corresponding to the plurality of second information requests to the third server apparatus in an order in which the corresponding plurality of second information requests is retained.

According to still another aspect, this specification also discloses a communication system including a plurality of server apparatuses configured to control communication among a plurality of terminal apparatuses. The plurality of server apparatuses includes a first server apparatus, a second server apparatus, and a third server apparatus different from one another. The first server apparatus has master authority for managing setting information relating to the communication. The communication system is configured to perform: transmitting a transfer request and the setting information from the first server apparatus to the second server apparatus, the transfer request being for requesting that the master authority is transferred from the first server apparatus to the second server apparatus; after the second server apparatus receives the transfer request and the setting information, transmitting a transfer notification from the second server apparatus to the third server apparatus directly or through the first server apparatus, the transfer notification being for notifying that the master authority is transferred from the first server apparatus to the second server apparatus; in response to receiving the transfer notification by the third server apparatus, transmitting a transfer response from the third server apparatus to the first server apparatus; receiving a first information request from the third server apparatus during a first period that is a period after the first server apparatus transmits the transfer request and the setting information to the second server apparatus and before the first server apparatus receives the transfer response from the third server apparatus; in response to receiving the transfer response by the first server apparatus, transmitting, after the first period elapses, the first information request from the first server apparatus to the second server apparatus; receiving a plurality of second information requests transmitted from the third server apparatus during a second period that is a period after the second server apparatus transmits the transfer notification to the third server apparatus and before the second server apparatus receives the first information request from the first server apparatus, and retaining the plurality of second information requests in a received order; and after the second period elapses, transmitting first setting information corresponding to the first information request from the second server apparatus to the third server apparatus, and subsequently transmitting a plurality of second setting information corresponding to the plurality of second information requests from the second server apparatus to the third server apparatus in an order in which the corresponding plurality of second information requests is retained.

BRIEF DESCRIPTION OF THE DRAWINGS

Embodiments in accordance with this disclosure will be described in detail with reference to the following figures wherein.

DETAILED DESCRIPTION

There may be a case where, as in the above resource management server, a server apparatus (hereinafter referred to as "master server apparatus") returning information depending on a request from an MCU is switched to another server apparatus. In this case, in a process of switching master server apparatuses, requests may simultaneously exist among which the one is for a master server apparatus before switching (hereinafter referred to as "old master server apparatus") and the one is for a master server apparatus after switching (hereinafter referred to as "new master server apparatus"), respectively. In this case, there is a possibility where processing to reply information depending on the respective requests is not performed in the order of the transmission of the requests and replies are transmitted and reach MCUs of the request source in an order different from the order of the transmission of the requests.

An example of an objective of this disclosure is to provide a communication method, a storage medium storing a communication program, and a communication system by which, in a case where master a server apparatus replying information depending on a plurality of requests is switched, processing for replying information depending on each of the plurality of requests is performed in an order of the requests to thereby reply information to the server apparatus of the request source.

<Outline of the Communication System 1>

Figure 1:
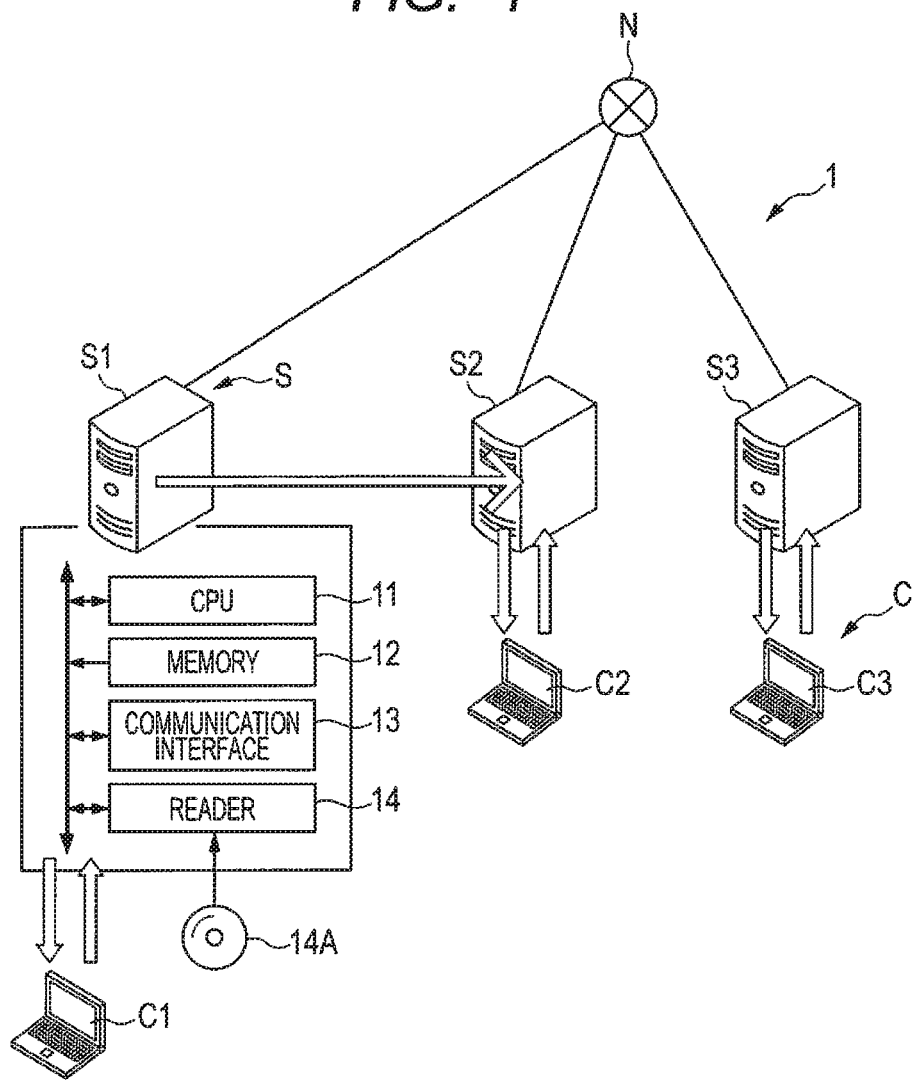
FIG. 1 is a diagram illustrating an outline of a communication system 1 and an electrical configuration of a server apparatus S.

With reference to FIG. 1, the following section will describe a communication system 1. The communication system 1 includes server apparatuses S1, S2, S3, and so on (hereinafter collectively referred to as "server apparatus S"), and terminal apparatuses C1, C2, C3, and so on (hereinafter collectively referred to as "terminal apparatus C"). The server apparatus S and the terminal apparatus C are mutually connected through a network N (LAN, the Internet, and so on). The terminal apparatus C performs communication with other terminal apparatuses C through the server apparatus S, thereby performing a teleconference. The server apparatus S intervenes among the terminal apparatuses C to control communication, and manages the teleconference. The terminal apparatus C is configured by installing a teleconference application program in a well-known personal computer (PC). The server apparatus S is configured by a Multipoint Control Unit (MCU) or by installing a dedicated application program in a well-known server. Although in FIG. 1 one terminal apparatus C is connected to each server apparatus S, two or more terminal apparatuses C may be connected to each server apparatus S.

The server apparatus S has a CPU 11, a memory 12, a communication interface 13, and a reader 14. The CPU 11 is responsible for the entirety of the control by the server apparatus S. The memory 12 stores therein various programs executed by the CPU 11, and setting information described later. The communication interface 13 is an interface element to provide communication through the network N. The reader 14 reads information stored in a storage medium 14A such as a semiconductor memory or an optical disc. The CPU 11 controls the reader 14 to read a program stored in the storage medium 14A and stores the data in the memory 12. The program stored in the memory 12 may also be downloaded from another server connected to the network N, for example.

In the following description, it is assumed that the CPUs 11 of the server apparatuses S1, S2, and S3 are referred to as "CPU 111", "CPU 112", and "CPU 113", respectively. It is assumed that the memories 12 of the server apparatuses S1, S2, and S3 are referred to as "memory 121", "memory 122", and "memory 123", respectively.

Master authority is given to any of the server apparatuses S1 to S3. A server apparatus S (hereinafter referred to as "the server apparatus Sm") having master authority manages the setting information. The setting information shows setting conditions regarding the details for the communication to perform a teleconference. For example, the setting information includes, for example, video permission/denial information showing whether to relay video information regarding video taken by a camera of the terminal apparatus C, audio permission/denial information showing whether to relay audio information regarding the audio collected by a microphone of the terminal apparatus C, and priority information showing the priority when the video information and the audio information are relayed. The server apparatus S controls the communication for the teleconference performed between the terminal apparatuses C based on the setting information stored in the memory 12. For example, when the relay of video information is permitted regarding the video permission/denial information of the setting information and the relay of audio information is denied regarding the audio permission/denial information, the server apparatus S relays only the video information between the terminal apparatuses C and does not relay the audio information. When the setting information has priority information showing that the video information is prioritized over the audio information for example, the server apparatus S prioritizes the video information over the audio information.

When the server apparatus S1 has master authority for example, server apparatuses S2 and S3 other than the server apparatus S1 transmit, to the server apparatus S1, an information request requesting the setting information. When the server apparatus S1 receives the information request data, then the server apparatus S1 transmits the setting information to the server apparatuses S2 and S3 having transmitted the information request data. Upon receiving the setting information, the server apparatuses S2 and S3 store the setting information in the memory 12. The server apparatuses S control the communication between the terminal apparatus C based on the setting information stored in the memory 12, respectively. The setting information is changed only by a server apparatus Sm having the master authority. In this manner, the setting information is synchronized within the communication system 1.

<Communication Sequence>

With reference to FIG. 2 to FIG. 5, the following section will describe communication sequences (the first communication sequence to the fourth communication sequence) when the server apparatus Sm having the master authority is switched from the server apparatus S1 to the server apparatus S2. For example, when the processing load of the CPU 11 of the server apparatus S1 having the master authority is increased, the master authority is transferred from the server apparatus S1 to the server apparatus S2. The CPU 11 of the server apparatus S reads and executes a program stored in the memory 12 to thereby execute a processing corresponding to the communication sequence.

<First Communication Sequence>

Figure 2:
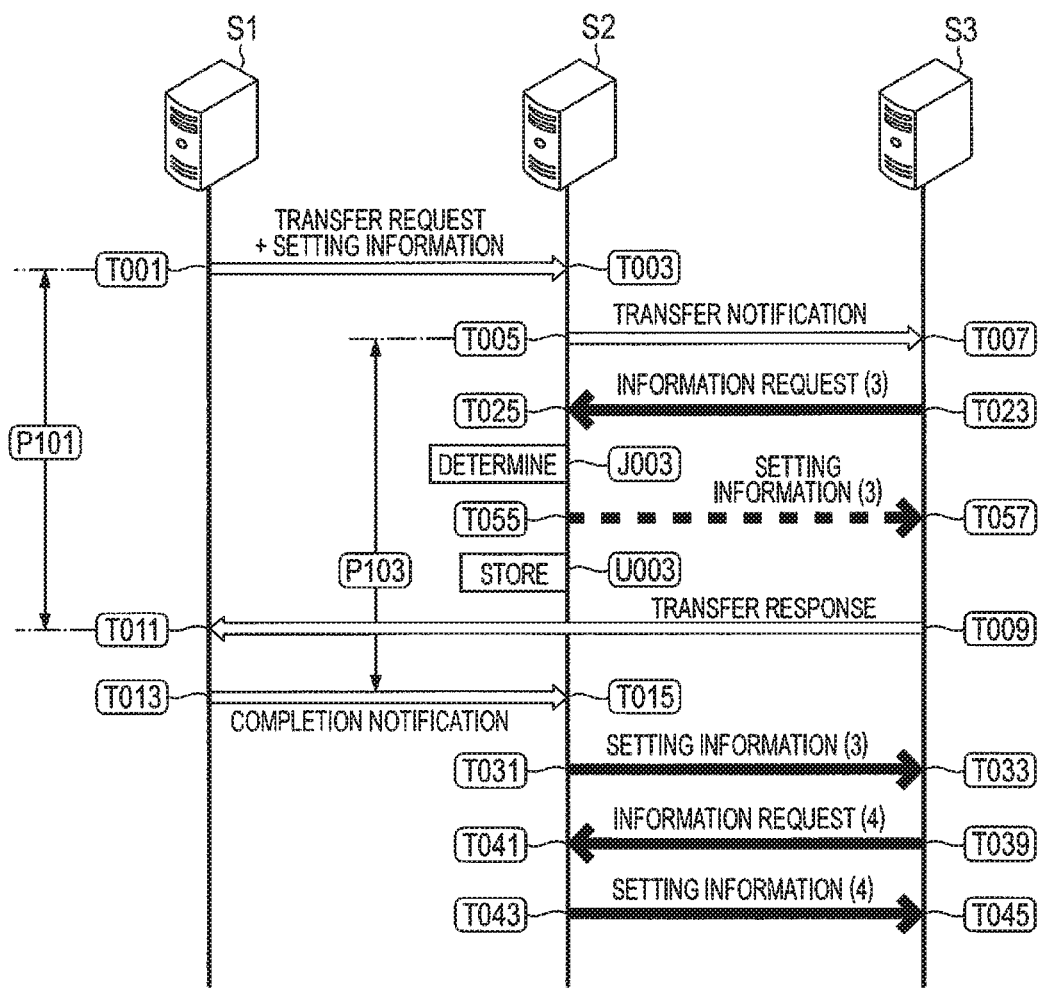
FIG. 2 is a diagram illustrating a first communication sequence.

A first communication sequence will be described with reference to FIG. 2. The CPU 111 of the server apparatus S1 determines the server apparatus S2 as the server apparatus S to which the master authority is transferred. The CPU 111 transmits, to the server apparatus S2, transfer request data requesting to transfer the master authority from the server apparatus S1 to the server apparatus S2 and the setting information stored in the memory 121 (T001). The transfer request data and the setting information may be simultaneously transmitted or may be transmitted at different timings. The transfer request data also may be defined as data including the setting information.

The CPU 112 of the server apparatus S2 receives the transfer request data and the setting information (T003). The CPU 112 stores the received setting information in the memory 122. The CPU 112 transmits, to the server apparatus S3, transfer notification data notifying that the master authority is transferred from the server apparatus S1 to the server apparatus S2 (T005). The CPU 112 also may transmit the transfer notification data through the server apparatus S1. In this case, the CPU 112 transmits the transfer notification data to the server apparatus S1. The CPU 111 of the server apparatus S1 receives the transfer notification data transmitted from the server apparatus S2, and transmits the transfer notification data to the server apparatus S3.

The CPU 113 of the server apparatus S3 receives the transfer notification data (T007). The CPU 113 transmits, to the server apparatus S1, transfer response data to notify the server apparatus S1 that the transfer notification data has been received (T009). The server apparatus S1 receives the transfer response data (T011). When no information request data is received from the server apparatus S3 during a period after the transfer request data and the setting information are transmitted to the server apparatus S2 in T001 and before the transfer response data is received from the server apparatus S3 in T011 (hereinafter referred to as "first period P101"), the CPU 111 transmits, to the server apparatus S2, completion notification data notifying that the procedure to transfer the master authority is completed (T013) after the first period P101 elapses. Due to this, the server apparatus S1 becomes a state of having no master authority. The CPU 112 of the server apparatus S2 receives the completion notification data (T015). Due to this, the server apparatus S2 becomes a state of having the master authority.

The CPU 113 of the server apparatus S3 in T005 receives the transfer notification data transmitted from the server apparatus S2 (T007), and determines that the master authority has been transferred from the server apparatus S1 to the server apparatus S2. The CPU 113 transmits the information request data to the server apparatus S2 (T023). In this embodiment, it is assumed that a plurality of information request data (hereinafter referred to as "a plurality of information request data (3)") are transmitted from the server apparatus S3 to the server apparatus S2. The number of transmitted information request data may be one.

In the period from the transmission by the CPU 112 of the server apparatus S2 in T005 of the transfer notification data to the server apparatus S3 to the reception in T015 of the completion notification data from the server apparatus S1 (hereinafter referred to as "second period P103"), the CPU 112 receives a plurality of information request data (3) transmitted from the server apparatus S3 (T025).

Each time the CPU 112 receives one of the plurality of information request data (3), the CPU 112 reads and acquires, from the memory 122, setting information corresponding to received information request data (3) (hereinafter referred to as "setting information (3)"). Then, the CPU 112 determines whether the acquired setting information (3) satisfies a particular condition (J003). When the acquired setting information (3) is setting information that requires a prompt response depending on the request for example, it is determined that the particular condition is satisfied. Specific examples of the setting information that requires a prompt response include entrance/exit information showing the terminal apparatus C having entered a conference room and the terminal apparatus C having exited the conference room, and comprehensive setting information applied to all terminal apparatuses C participating in the conference room (hereinafter referred to as "comprehensive setting information") for example. When the setting information has a smaller necessity of prompt response on the other hand, it is determined that the particular condition is not satisfied. Specific examples of the setting information having a smaller necessity of a prompt response include the setting information applied only to a specific terminal apparatus C among the terminal apparatuses C participating in the conference room (e.g., the display name (screen name) of a user displayed on the specific terminal apparatus C, hereinafter referred to as "individual setting information"). When the setting information (3) satisfies the particular condition, then the CPU 112 transmits the setting information (3) to the server apparatus S3 just after the reception of corresponding information request data (3) (T055). When a plurality of setting information (3) satisfy the particular condition, the plurality of setting information (3) is transmitted to the server apparatus S3 in an order in which the plurality of corresponding information request data (3) has been received. The CPU 113 of the server apparatus S3 receives at least one setting information (3) (T057). Then, the CPU 113 stores at least one received setting information (3) in the memory 123.

When the setting information (3) does not satisfy the particular condition on the other hand, the CPU 112 of the server apparatus S2 stores corresponding information request data (3) in the memory 122 (U003). When a plurality of setting information (3) does not satisfy the particular condition, then a plurality of information request data (3) corresponding to the plurality of setting information (3), respectively, is stored in the memory 122 in an order of the reception from the server apparatus S3 (U003). After the second period P103 elapses, the CPU 112 transmits, to the server apparatus S3, the setting information (3) corresponding to the information request data (3) stored in the memory 122 (T031). When the memory 122 stores therein a plurality of information request data (3), the plurality of setting information (3) corresponding to each of the plurality of information request data (3) is transmitted to the server apparatus S3 in an order in which corresponding information request data (3) have been stored (T031). The CPU 113 of the server apparatus S3 receives at least one setting information (3) (T033). The CPU 113 stores at least one received setting information (3) in the memory 123.

The CPU 113 of the server apparatus S3 also transmits the information request data to the server apparatus S2 (T039). In this embodiment, it is assumed that a plurality of information request data (hereinafter referred to as "a plurality of information request data (4)") is transmitted from the server apparatus S3 to the server apparatus S2. The number of transmitted information requests may be one. After the second period P103 elapses, the CPU 112 of the server apparatus S2 receives a plurality of information request data (4) (T041). Each time the CPU 112 receives one of the plurality of information request data (4), the CPU 112 reads and acquires, from the memory 122, the setting information corresponding to the received information request data (4) (hereinafter referred to as "setting information (4)"). The CPU 112 transmits the acquired setting information (4) to the server apparatus S3 just after the reception of the corresponding information request data (4) (T043). Specifically, the plurality of setting information (4) is transmitted to the server apparatus S3 in an order in which the plurality of corresponding information request data (4) has been received. The CPU 113 of the server apparatus S3 receives the plurality of setting information (4) (T045). The CPU 113 stores the plurality of received setting information (4) in the memory 123.

<Second Communication Sequence>

Figure 3:
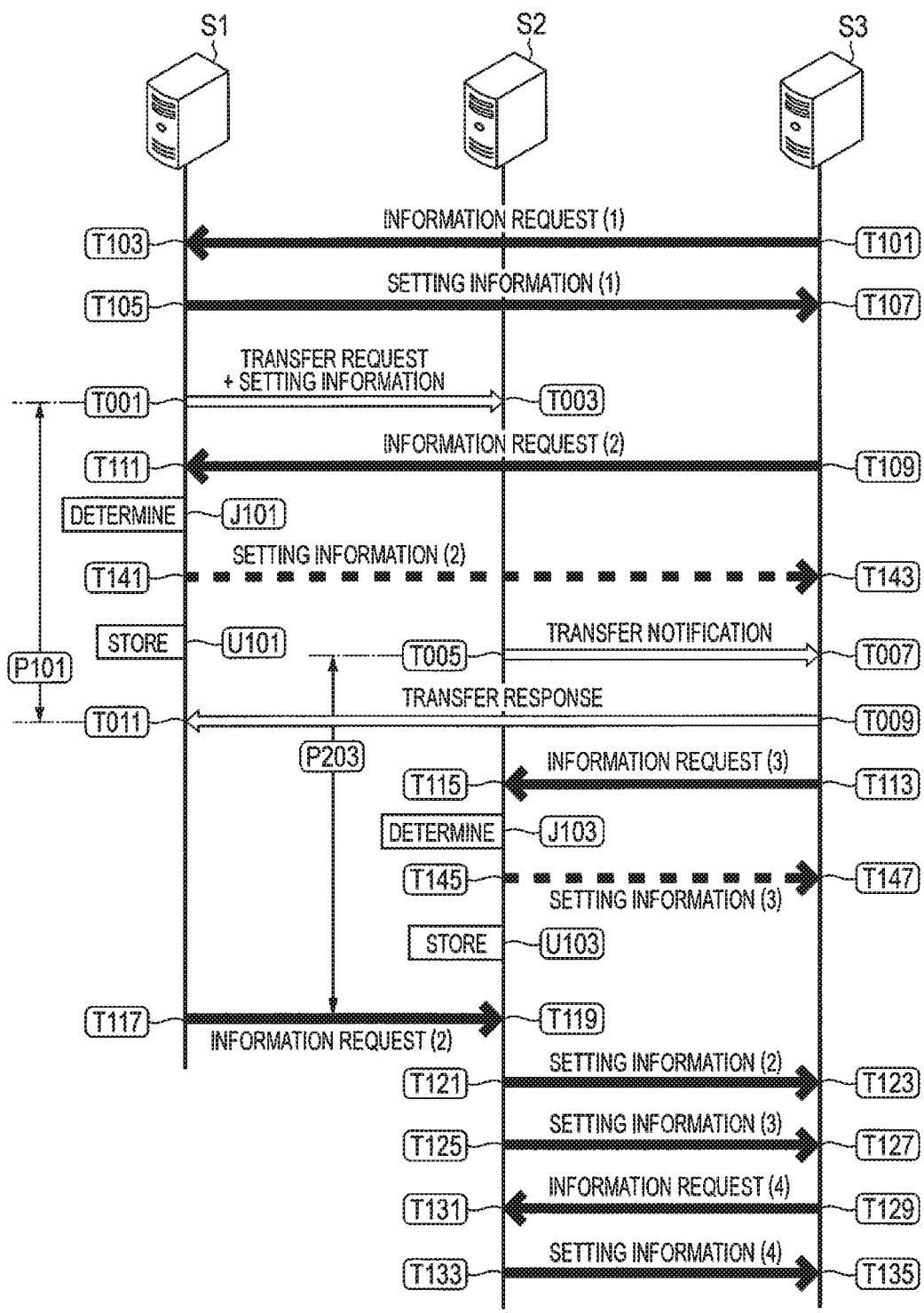
FIG. 3 is a diagram illustrating a second communication sequence.

A second communication sequence will be described with reference to FIG. 3. The second communication sequence is different from the first communication sequence in that the information request data is transmitted from the server apparatus S3 to the server apparatus S1 during the first period P101 and is received by the server apparatus S1. The other communication is the same as that of the first communication sequence. Hereinafter, communication steps identical to those in the first communication sequence are designated by the same reference numerals to avoid or simplify duplicating description.

The CPU 113 of the server apparatus S3 transmits the information request data to the server apparatus S1 having the master authority (T101). In this embodiment, it is assumed that a plurality of information request data (hereinafter referred to as "a plurality of information request data (1)") is transmitted from the server apparatus S3 to the server apparatus S1. The number of transmitted information request data may be one. The CPU 111 of the server apparatus S1 receives the plurality of information request data (1) (T103). Each time the CPU 111 receives one of the plurality of information request data (1), the CPU 111 reads and acquires setting information corresponding to the received information request data (1) (hereinafter referred to as "setting information (1)") from the memory 121. The CPU 111 transmits the acquired setting information (1) to the server apparatus S3 just after the reception of the corresponding information request data (1) (T105). Specifically, the plurality of setting information (1) is transmitted to the server apparatus S3 in an order in which the plurality of corresponding information request data (1) are received. The CPU 113 of the server apparatus S3 receives the plurality of setting information (1) (T107). The CPU 113 stores the plurality of received setting information (1) in the memory 123.

The CPU 111 of the server apparatus S1 transmits the transfer request data and the setting information to the server apparatus S2 (T001). The CPU 112 of the server apparatus S2 receives the transfer request data and the setting information (T003).

The CPU 112 stores the received setting information in the memory 122. The CPU 112 transmits the transfer notification data to the server apparatus S3 (T005). The CPU 113 of the server apparatus S3 receives the transfer notification data (T007). The CPU 113 transmits the transfer response data to the server apparatus S1 (T009). The CPU 111 of the server apparatus S1 receives the transfer response data (T011).

The CPU 113 of the server apparatus S3 determines that the server apparatus S1 has the master authority until the transfer notification data is received (T007). The CPU 113 transmits the information request data to the server apparatus S1 (T109). In this embodiment, it is assumed that a plurality of information request data (hereinafter referred to as "a plurality of information request data (2)") is transmitted from the server apparatus S3 to the server apparatus S1. The number of transmitted information request data may be one. The CPU 111 receives the plurality of information request data (2) during the first period P101 (T111). Each time the CPU 111 receives one of the plurality of information request data (2), the CPU 111 reads and acquires the setting information corresponding to the received information request data (2) (hereinafter referred to as "setting information (2)") from the memory 121. The CPU 111 determines whether the acquired setting information (2) satisfies the particular condition (J101). The CPU 111 determines that the acquired setting information (2) satisfies the particular condition when the acquired setting information (2) is the entrance/exit information or the comprehensive setting information for example. When the acquired setting information (2) satisfies the particular condition, the CPU 111 transmits the setting information (2) to the server apparatus S3 just after the reception of the corresponding information request data (2) (T141). When a plurality of setting information (2) satisfies the particular condition, the plurality of setting information (2) is transmitted to the server apparatus S3 in an order in which a plurality of corresponding information request data (2) has been received. The CPU 113 of the server apparatus S3 receives at least one setting information (2) (T143). The CPU 113 stores at least one received setting information (2) in the memory 123.

On the other hand, when the acquired setting information (2) is the individual setting information for example, the CPU 111 of the server apparatus S1 determines that the acquired setting information (2) does not satisfy the particular condition. When the acquired setting information (2) does not satisfy the particular condition, then the CPU 111 stores the corresponding information request data (2) in the memory 121 (U101). When the plurality of setting information (2) does not satisfy the particular condition, the plurality of information request data (2) corresponding to each of the plurality of setting information (2) is stored in the memory 121 in an order in which the plurality of information request data (2) has been received from the server apparatus S3 (U101). After the first period P101 elapses, the CPU 111 transmits, to the server apparatus S2, the information request data (2) stored in the memory 121 (T117). When the plurality of information request data (2) is stored in the memory 121, the plurality of information request data (2) is transmitted to the server apparatus S3 in an order in which the plurality of information request data (2) is stored in the memory 121 (T117). The CPU 112 of the server apparatus S2 receives at least one information request data (2) (T119). Here, a period after the transfer notification data is transmitted to the server apparatus S3 in T005 and before the plurality of information request data (2) is received from the server apparatus S1 in T119 (hereinafter referred to as "second period P203") corresponds to the second period P103 (see FIG. 2) in the first communication sequence. The CPU 112 of the server apparatus S2 stores, in the memory 122, at least one received information request data (2) in an order of the reception.

The CPU 113 of the server apparatus S3 receives the transfer notification data transmitted in T005 from the server apparatus S2 (T007), and determines that the master authority has been transferred from the server apparatus S1 to the server apparatus S2. The CPU 113 transmits the information request data to the server apparatus S2 (T113). In this embodiment, it is assumed that a plurality of information request data (hereinafter referred to as "a plurality of information request data (3)") is transmitted from the server apparatus S3 to the server apparatus S2. The number of transmitted information request data may be one. The CPU 112 of the server apparatus S2 receives the plurality of information request data (3) transmitted from the server apparatus S3 during the second period P203 (T115). Each time the CPU 112 receives one of the plurality of information request data (3), the CPU 112 reads and acquires the setting information (3) corresponding to the received information request data (3) from the memory 122. The CPU 112 determines whether the acquired setting information (3) satisfies the particular condition (J103). When the acquired setting information (3) is the entrance/exit information or the comprehensive setting information for example, the CPU 112 determines that the acquired setting information (3) satisfies the particular condition. When the acquired setting information (3) satisfies the particular condition, the CPU 112 transmits the setting information (3) to the server apparatus S3 just after the reception of the corresponding information request data (3) (T145). When the plurality of setting information (3) satisfies the particular condition, the plurality of setting information (3) is transmitted to the server apparatus S3 in an order in which the plurality of information request data (3) has been received. The CPU 113 of the server apparatus S3 receives at least one setting information (3) (T147). The CPU 113 stores at least one received setting information (3) in the memory 123. On the other hand, when the acquired setting information (3) is the individual setting information for example, the CPU 112 of the server apparatus S2 determines that the acquired setting information (3) does not satisfy the particular condition. When the acquired setting information (3) does not satisfy the particular condition, the CPU 112 stores the corresponding information request data (3) in the memory 122 (U103). When a plurality of setting information (3) does not satisfy the particular condition, a plurality of information request data (3) corresponding to the plurality of setting information (3) is stored in the memory 122 in an order of the reception from the server apparatus S3 (U103).

After the second period P203 elapses, the CPU 112 reads and acquires at least one information request data (2) received in T119 from the server apparatus S1 from the memory 122. The CPU 112 reads and acquires the setting information (2) corresponding to at least one acquired information request data (2) from the memory 122. The CPU 112 transmits the acquired setting information (2) to the server apparatus S3 (T121). When a plurality of information request data (2) is received in T119, the CPU 112 stores the plurality of information request data (2) in the memory 122 in an order of the reception. In this case, the CPU 112 transmits, to the server apparatus S3, the acquired setting information (2) in an order in which the corresponding information request data (2) is stored in the memory 122 (T121). The CPU 113 of the server apparatus S3 receives at least one setting information (2) (T123). The CPU 113 stores at least one received setting information (2) in the memory 123 in an order in which the information has been received.

Next, the CPU 112 reads and acquires, in U103, at least one information request data (3) stored in the memory 122 from the memory 122. The CPU 112 reads and acquires the setting information (3) corresponding to at least one acquired information request data (3) from the memory 122. The CPU 112 transmits the acquired setting information (3) to the server apparatus S3 (T125). When a plurality of information request data (3) is stored in the memory 122 in U103, the CPU 112 transmits, to the server apparatus S3, the setting information (3) corresponding to the plurality of stored information request data (3) in an order in which the corresponding information request data (3) is stored (T125). The plurality of information request data (3) is stored in the memory 122 in an order of the reception in T115. Thus, the plurality of setting information (3) is transmitted to the server apparatus S3 in an order in which a plurality of corresponding information request data (3) has been received. The CPU 113 of the server apparatus S3 receives at least one setting information (3) (T127). The CPU 113 stores at least one received setting information (3) in the memory 123 in an order of the reception.

The CPU 113 of the server apparatus S3 further transmits the information request data to the server apparatus S2 (T129). In this embodiment, it is assumed that a plurality of information request data (hereinafter referred to as "a plurality of information request data (4)") is transmitted from the server apparatus S3 to the server apparatus S2. The number of transmitted information request data may be one. After the second period P203 elapses, the CPU 112 of the server apparatus S2 receives a plurality of information request data (4) (T131). Each time the CPU 112 receives one of the plurality of information request data (4), the CPU 112 reads and acquires the setting information (4) corresponding to the received information request data (4) from the memory 122. The CPU 112 transmits the acquired setting information (4) to the server apparatus S3 just after the reception of the corresponding information request data (4) (T133). Specifically, a plurality of the setting information (4) is transmitted to the server apparatus S3 in an order in which a plurality of the corresponding information request data (3) is received. The CPU 113 of the server apparatus S3 receives the plurality of setting information (4) (T135). The CPU 113 stores the plurality of received setting information (4) in the memory 123.

<Third Communication Sequence>

Figure 4:
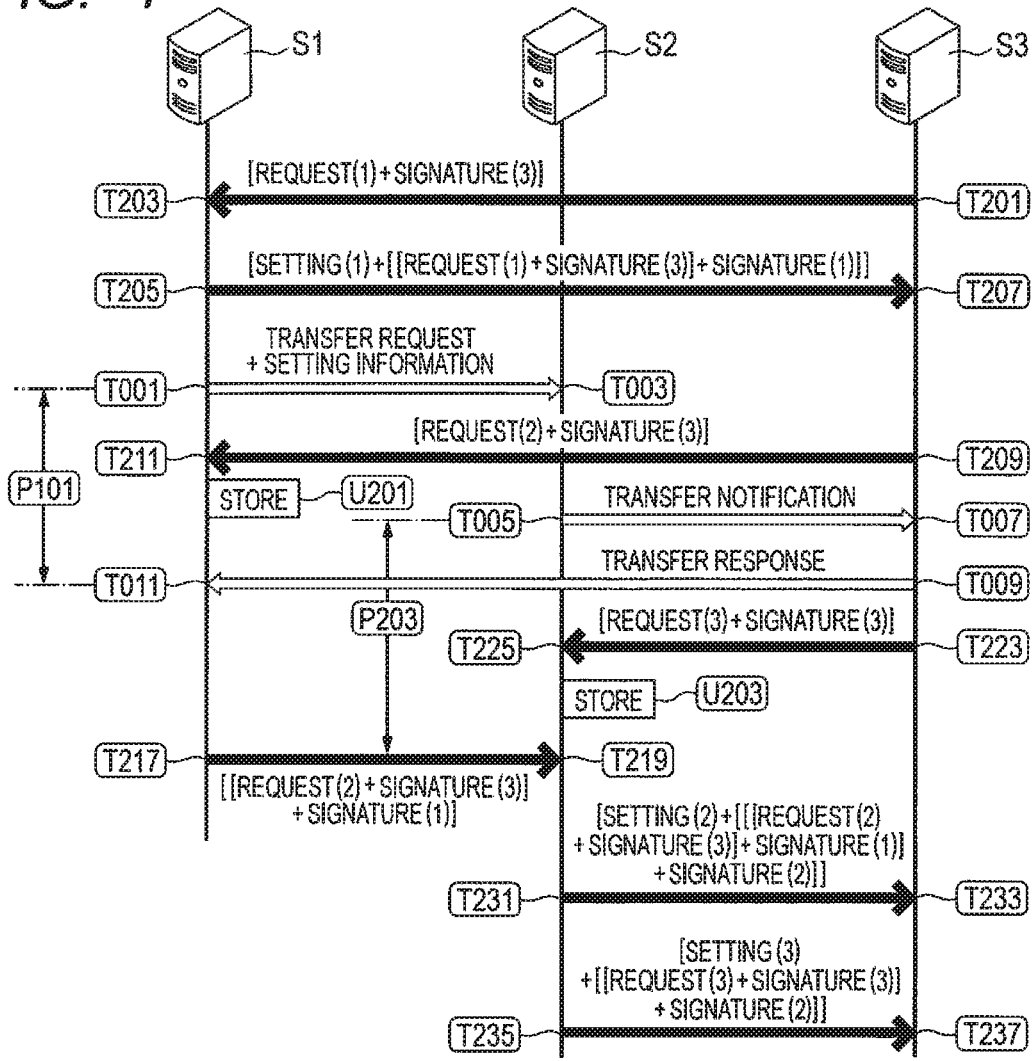
FIG. 4 is a diagram illustrating a third communication sequence.

A third communication sequence will be described with reference to FIG. 4. The difference from the second communication sequence is that data transmitted and received among the server apparatuses S1 to S3 additionally includes signature data by which the server apparatuses S are authenticated. Specific examples of the signature data include encryption data that is obtained by encrypting an ID of each server apparatus S, secret key data allocated to each server apparatus S, and so on. Each server apparatus S decrypts the signature data added to the data to thereby authenticate the server apparatus S to which the signature data is added. Hereinafter, communication steps identical to those in the second communication sequence are designated by the same reference numerals to avoid or simplify duplicating description.

The CPU 113 of the server apparatus S3 adds, to each of the plurality of information request data (1), signature data by which the server apparatus S3 is authenticated, and transmits the resultant data to the server apparatus S1 (T201). In the following description, authentication data by which a server apparatus X (X=any of 1, 2, or 3) is authenticated will be referred to as "signature data (X)") and information request data (M) (M=any of 1, 2, 3, or 4) to which signature data (X) is added will be referred to as "[request (M)+signature (X)]". The CPU 111 of the server apparatus S1 receives a plurality of [request (1)+signature (3)] (T203).

Each time the CPU 111 receives one of the plurality of [request (1)+signature (3)], the CPU 111 decrypts the signature data (3) included in the received [request (1)+signature (3)] to authenticate the server apparatus S3. Each time the CPU 111 receives the [request (1)+signature (3)], the CPU 111 acquires, from the memory 121, the setting information (1) corresponding to the information request data (1) included in the received [request (1)+signature (3)]. The CPU 111 adds, to [request (1)+signature (3)], the signature data (1) by which the server apparatus S1 is authenticated. In the following description, [request (M)+signature (X)] to which signature data (Y) is added will be referred to as "[[request (M)+signature (X)]+signature (Y)]". The CPU 111 further adds the acquired setting information (1) to [[request (1)+signature (3)]+signature (1)]. In the following description, [[request (M)+signature (X)]+signature (Y)] to which setting information (N) is added (N=any of 1, 2, 3, or 4) will be referred to as "[setting (N)+[[request (M)+signature (X)]+signature (Y)]]".

Each time the CPU 111 receives [request (1)+signature (3)], the CPU 111 transmits the corresponding [setting (1)+[[request (1)+signature (3)]+signature (1)]] to the server apparatus S3 (T205). The CPU 113 of the server apparatus S3 receives a plurality of [setting (1)+[[request (1)+signature (3)]+signature (1)]] (T207). Each time the CPU 113 receives [setting (1)+[[request (1)+signature (3)]+signature (1)]], the CPU 113 decrypts the signature data (1) included in each of the plurality of [setting (1)+[[request (1)+signature (3)]+signature (1)]] to authenticate the server apparatus S1. The CPU 113 acquires the setting information (1) included in the received [setting (1)+[[request (1)+signature (3)]+signature (1)]], and stores the setting information (1) in the memory 123.

The CPU 113 of the server apparatus S3 adds the signature data (3) to each of the plurality of information request data (2), and transmits the resultant data to the server apparatus S1 (T209). The CPU 111 of the server apparatus S1 receives a plurality of [request (2)+signature (3)] during the first period P101 (T211). Each time the CPU 111 receives [request (2)+signature (3)], the CPU 111 decrypts the signature data (3) included in the received [request (2)+signature (3)] to authenticate the server apparatus S3. Each time the CPU 111 receives the information request data (2), the CPU 111 reads and acquires the setting information (2) corresponding to the received information request data (2) of the plurality of [request (2)+signature (3)] from the memory 121. When the CPU 111 determines that the setting information (2) does not satisfy the particular condition, the CPU 111 stores the corresponding [request (2)+signature (3)] in the memory 122 (U201). In the following description, it is assumed that none of the setting information (2) corresponding to the information request data (2) of the plurality of [request (2)+signature (3)] satisfies the particular condition. In this case, the plurality of [request (2)+signature (3)] is stored in the memory 121 in an order of the reception (U201).

After the first period P101 elapses, the CPU 111 adds the signature data (1) to each of the plurality of [request (2)+signature (3)] sequentially stored in the memory 121, and transmits the resultant data to the server apparatus S2 (T217). The CPU 112 of the server apparatus S2 receives a plurality of [[request (2)+signature (3)]+signature (1)] (T219). Each time the CPU 112 receives [[request (2)+signature (3)]+signature (1)1, the CPU 112 decrypts the signature data (1) included in the received [[request (2)+signature (3)]+signature (1)] to authenticate the server apparatus S1. The CPU 112 stores, in the memory 122, the plurality of received [[request (2)+signature (3)]+signature (1)] in an order of the reception.

The CPU 113 of the server apparatus S3 adds the authenticate data (3) to each of the plurality of information request data (3), and transmits the resultant data to the server apparatus S2 (T223). The CPU 112 of the server apparatus S2 receives, during the second period P203, a plurality of [request (3)+signature (3)] transmitted from the server apparatus S3 (T225). Each time the CPU 112 receives [request (3)+signature (3)], the CPU 112 decrypts the signature data (3) included in the received [request (3)+signature (3)] to authenticate the server apparatus S3. Each time the CPU 112 receives [request (3)+signature (3)], the CPU 112 reads and acquires the setting information (3) corresponding to the received [request (3)+signature (3)] from the memory 122. When the CPU 112 determines that the setting information (3) does not satisfy the particular condition, the CPU 122 stores the corresponding [request (3)+signature (3)] in the memory 122 (U203). In the following description, it is assumed that none of setting information (3) corresponding to the respective information request data (3) of the plurality of [request (3)+signature (3)] satisfies the particular condition. In this case, the plurality of [request (3)+signature (3)] is stored in the memory 122 in an order of the reception (U203).

After the second period P203 elapses, the CPU 112 reads and acquires, from the memory 122, the plurality of [[request (2)+signature (3)]+signature (1)] received from the server apparatus S1 in T219. The CPU 112 reads and acquires, from the memory 122, the setting information (2) corresponding to the information request data (2) included in the acquired [[request (2)+signature (3)]+signature (1)]. The CPU 112 adds the signature data (2) to each of the plurality of acquired [[request (2)+signature (3)]+signature (1)]. In the following description, [[request (M)+signature (X)]+signature (Y)] to which the signature data (Z) is added (Z=any of 1, 2, or 3) is denoted as "[[[request (M)+signature (X)]+signature (Y)]+signature (Z)]". The CPU 112 further adds the acquired setting information (2) to [[[request (2)+signature (3)]+signature (1)]+signature (2)]. In the following description, [[[request (M)+signature (X)]+signature (Y)]+signature (Z)] to which the setting information (N) is added (N=any of 1, 2, 3, or 4) is denoted as "[setting (N)+[[[request (M)+signature (X)]+signature (Y)]+signature (Z)]]". The CPU 112 transmits, to the server apparatus S3, a plurality of [setting (2)+[[[request (2)+signature (3)]+signature (1)]+signature (2)]] in an order in which the corresponding [[request (2)+signature (3)]+signature (1)] are stored in the memory 122 (T231). The CPU 113 of the server apparatus S3 receives the plurality of [setting (2)+[[[request (2)+signature (3)]+signature (1)]+signature (2)] (T233). The CPU 113 decrypts the signature data (2) included in each of the plurality of received [setting (2)+[[[request (2)+signature (3)]+signature (1)]+signature (2)]] to authenticate the server apparatus S2. The CPU 113 stores the setting information (2) included in each of the plurality of received [setting (2)+[[[request (2)+signature (3)]+signature (1)]+signature (2)]] in the memory 123.

Next, the CPU 112 reads and acquires the plurality of [request (3)+signature (3)] stored in the memory 122 in U203 from the memory 122. The CPU 112 reads and acquires, from the memory 122, the setting information (3) corresponding to the information request data (3) of each of the plurality of acquired [request (3)+signature (3)]. The CPU 112 adds the signature data (2) to each of the plurality of acquired [request (3)+signature (3)]. The CPU 112 further adds the acquired setting information (3) to [[request (3)+signature (3)]+signature (2)]. The CPU 112 transmits the plurality of [setting (3)+[[request (3)+signature (3)]+signature (2)]] to the server apparatus S3 in an order in which the corresponding [request (3)+signature (3)] are stored in the memory 122 (T235). The CPU 113 of the server apparatus S3 receives the plurality of [setting (3)+[[request (3)+signature (3)]+signature (2)]] (T237). The CPU 113 decrypts the signature data (2) included in each of the plurality of received [setting (3)+[[request (3)+signature (3)]+signature (2)]] to authenticate the server apparatus S2. The CPU 113 stores, in the memory 123, the setting information (3) included in each of the plurality of received [setting (3)+[[request (3)+signature (3)]+signature (2)]].

<Fourth Communication Sequence>

Figure 5:
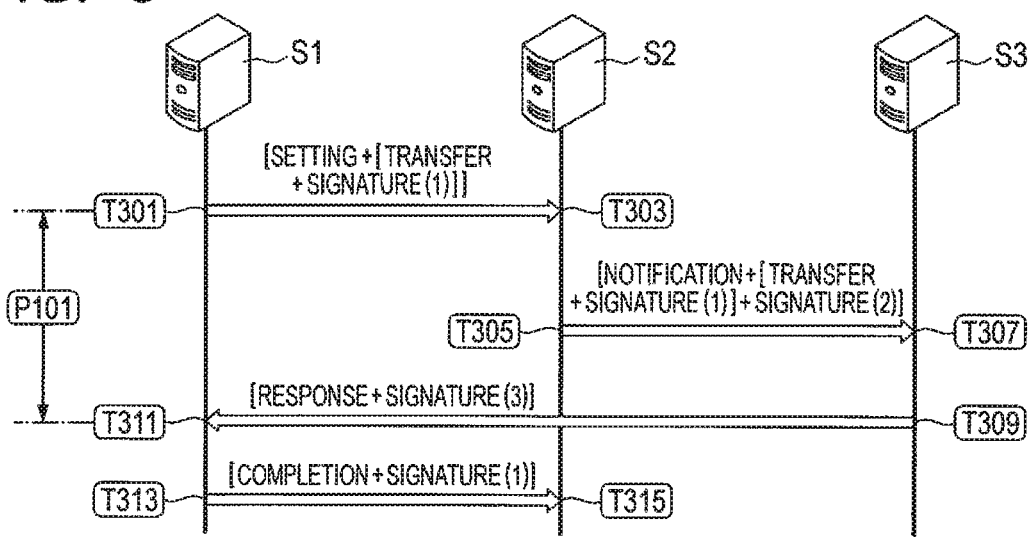
FIG. 5 is a diagram illustrating a fourth communication sequence.

A fourth communication sequence will be described with reference to FIG. 5. The difference from the first communication sequence is that data transmitted and received among the server apparatuses S1 to S3 additionally includes signature data by which the respective server apparatuses S are authenticated. Hereinafter, communication steps identical to those in the first communication sequence are designated by the same reference numerals to avoid or simplify duplicating description.

The CPU 111 of the server apparatus S1 adds the signature data (1) to the transfer request data. In the following description, the transfer request data to which the signature data (1) is added will be denoted as "[transfer+signature (1)]". The CPU 111 further reads and acquires the setting information stored in the memory 121, and adds the setting information to [transfer+signature (1)]. In the following description, [transfer+signature (1)] to which the setting information is added will be denoted as [setting+[transfer+signature (1)]]. The CPU 111 transmits [setting+[transfer+signature (1)]] to the server apparatus S2 (T301).

The CPU 112 of the server apparatus S2 receives [setting+[transfer+signature (1)]] (T303). The CPU 112 decrypts the signature data (1) included in the received [setting+[transfer+signature (1)]] to authenticate the server apparatus S1. The CPU 112 stores the setting information included in the received [setting+[transfer+signature (1)]] in the memory 122. The CPU 112 adds the transfer notification data and the signature data (2) to [transfer+signature (1)] except for the setting information among the received [setting+[transfer+signature (1)]]. In the following description, [transfer+signature (1)] to which the transfer notification data and the signature data (2) are added will be denoted as "[notification+[transfer+signature (1)]+signature (2)]". The CPU 112 transmits [notification+[transfer+signature (1)]+signature (2)] to the 3 0 server apparatus S3 (T305). The CPU 112 may transmit [notification+[transfer+signature (1)]+signature (2)] through the server apparatus S1. In this case, the CPU 112 transmits [notification+[transfer+signature (1)]+signature (2)] to the server apparatus S1. The CPU 111 of the server apparatus S1 receives [notification+[transfer+signature (1)]+signature (2)] transmitted from the server apparatus S2, and transmits [notification+[transfer+signature (1)]+signature (2)] to the server apparatus S3.

The CPU 113 of the server apparatus S3 receives [notification+[transfer+signature (1)]+signature (2)] (T307). The CPU 113 decrypts the signature data (2) included in [notification+[transfer+signature (1)]+signature (2)] to authenticate the server apparatus S2 and decrypts the signature data (1) to authenticate the server apparatus S1. The CPU 113 adds the signature data (3) to the transfer response data. In the following description, the transfer response data to which the signature data (3) is added will be denoted as "[response+signature (3)]". The CPU 113 transmits [response+signature (3)] to the server apparatus S1 (T309).

The server apparatus S1 receives [response+signature (3)] (T311). The CPU 111 decrypts the signature data (3) included in [response+signature (3)] to authenticate the server apparatus S3. The CPU 111 adds the signature data (1) to the completion notification data. In the following description, the completion notification data to which the signature data (1) is added will be denoted as "[completion+signature (1)]". After the first period P101 elapses, the CPU 111 transmits [completion+signature (1)] to the server apparatus S2 (T313). The CPU 112 of the server apparatus S2 receives [completion+signature (1)] (T315). The CPU 112 decrypts the signature data (1) included in [completion+signature (1)] to authenticate the server apparatus S1.

<Operation and Effects of the Embodiment>

In each communication sequence, the second periods P103 and P203 correspond to a period in which the server apparatus S3 is notified that the master authority will be transferred from the server apparatus S1 to the server apparatus S2. In this period, there may be a possibility that the server apparatus S3 firstly transmits the information request data (2) to the server apparatus S1 and then transmit the information request data (3) to the server apparatus S2. In this case, the processing by the server apparatus S1 to reply the setting information (2) and the processing by the server apparatus S2 to reply the setting information (3) may be performed in an inverted order. In this case, when the setting information is updated in the server apparatus S2 for example, setting information (2) before update and setting information (3) after update are transmitted to the server apparatus S3 in this order, which is not preferred. When a plurality of information request data (2) are transmitted to the server apparatus S1 and then a plurality of information request data (3) is transmitted to the server apparatus S2, the corresponding plurality of setting information (2) and plurality of setting information (3) may reach the server apparatus S3 in an order different from the order of the transmission of the corresponding information request data, which is not preferred.

To prevent this, after the second period P203 elapses, the server apparatus S2 firstly transmits, to the server apparatus S3, the plurality of setting information (2) corresponding to the plurality of information request data (2) received from the server apparatus S1 (T121). Next, the server apparatus S2 transmits, to server apparatus S3, a plurality of the setting information (3) corresponding to a plurality of information request data (3) directly received from the server apparatus S3 (T125). The plurality of information request data (2) and the plurality of information request data (3) are retained in an order of the reception, respectively (U101, U103). Then, the server apparatus S2 transmits, to the server apparatus S3, the corresponding plurality of setting information (2) and plurality of setting information (3) in an order in which the plurality of information request data (2) and the plurality of information request data (3) are retained (T121, T125). Thus, the server apparatus S3 receives the corresponding plurality of setting information (2) and plurality of setting information (3) in an order of the transmission of the plurality of information request data (2) and the plurality of information request data (3), respectively (T123, T127). Thus, even when the master authority is transferred from the server apparatus S1 to the server apparatus S2, the server apparatus S3 acquires appropriate setting information.

The first period P101 corresponds to a period in which the master authority is transferred to the server apparatus S2 and the server apparatus S3 is notified that the master authority is transferred. In this period, there is a possibility that the server apparatus S3 transmits the information request data to the server apparatus S1. When the setting information depending on the information request data is directly transmitted from the server apparatus S1 to the server apparatus S3 in a case where the setting information is already updated in the server apparatus S2, for example, setting information before update is transmitted to the server apparatus S3, which is not preferred. To prevent this, when a plurality of information request data (2) is received from the server apparatus S3 during the first period P101 (T111), the server apparatus S1 stores the plurality of information request data (2) in the memory 121 in an order of the reception of the plurality of information request data (2) (U101) without transmitting the corresponding setting information immediately. After the first period P101 elapses, the server apparatus S1 transmits the plurality of information request data (2) to the server apparatus S2 in an order of the reception (T117). That is, the server apparatus S1 transmits, after the server apparatus S3 is notified of the transfer of the master authority, the plurality of information request data (2) to the server apparatus S2. This allows the server apparatus S3 to acquire accurate setting information. The server apparatus S2 transmits the corresponding plurality of setting information (2) to the server apparatus S3 in an order in which the server apparatus S3 has transmitted the plurality of information request data (2) (T121). Thus, the server apparatus S3 receives the corresponding plurality of setting information (2) in an order of the transmission of the plurality of information request data (2) (T123).

In the case of setting information having a lower possibility of being updated, for example, even when the setting information (2) is directly transmitted from the server apparatus S1 to the server apparatus S3, a problem of consistency of the setting information is not likely to occur. Thus, when the server apparatus S1 receives the plurality of information request data (2) from the server apparatus S3 during the first period P101 (T111), the server apparatus S1 determines whether each of the plurality of setting information (2) corresponding to the plurality of the information request data (2) satisfies the particular condition (J101). Regarding the setting information (2) determined to satisfy the particular condition, the server apparatus S1 transmits the setting information (2) to the server apparatus S3 just after the corresponding information request data is received (2) without transmitting the setting information (2) after the first period P101 elapses (T141). In this case, the server apparatus S3 promptly acquires the setting information (2).

When the setting information has a lower possibility of being updated, for example, even when the setting information (3) is directly transmitted to the server apparatus S3 just after the server apparatus S2 receives the information request data (3) from the server apparatus S3, a problem of consistency of the setting information is not likely to occur. When the server apparatus S2 receives a plurality of information request data (3) from the server apparatus S3 during the second period P203 (T115), the server apparatus S2 determines whether each of the plurality of the second setting information (3) corresponding to the plurality of information request data (3) satisfies the particular condition (J103). Regarding the setting information (3) determined to satisfy the particular condition, the server apparatus S2 transmits the setting information (3) to the server apparatus S3 just after the corresponding information request data (3) is received (T145) without transmitting the setting information (3) after the second period P203 elapses. In this case, the server apparatus S3 promptly acquires the setting information (3).

When the server apparatus S2 receives the plurality of information request data (4) from the server apparatus S3 after the elapse of the second period P203 (T131), the server apparatus S2 transmits the plurality of setting information (4) corresponding to the plurality of information request data (4) to the server apparatus S3 just after the corresponding information request data (4) is received (T133). In this case, the server apparatus S3 promptly acquires the setting information (4). Since the master authority has been transferred to the server apparatus S2, the server apparatus S3 acquires accurate setting information (4) from the server apparatus S2.

In the third communication sequence, when the server apparatus 51 transmits the information request data (2) to the server apparatus S2 (T217), the server apparatus 51 transmits, to the server apparatus S2, [[request (2)+signature (3)]+signature (1)] including the signature data (1) for authenticating the server apparatus 51. In response to receiving [[request (2)+signature (3)]+signature (1)] (T219), the server apparatus S2 transmits [setting (2)+[[[request (2)+signature (3)]+signature (1)]+signature (2)]11 newly including the setting information (2) and the signature data (2) to the server apparatus S3 (T231). In this case, the server apparatus S3 determines, based on the signature data (1), that the server apparatus S2 has transmitted the setting information (2) in response to the information request data (2) transmitted from the server apparatus 51. Thus, the server apparatus S3 determines that, although the setting information (2) has been acquired from the server apparatus S2 in response to the information request data (2) transmitted to the server apparatus 51, the acquired setting information (2) corresponds to the information request data (2) transmitted from the server apparatus S3 itself.

In the fourth communication sequence, the server apparatus 51 transmits, to the server apparatus S2, [setting+[transfer+signature (1)]] obtained by adding the signature data (1) to the transfer request data (T301). In response to receiving [setting+[transfer+signature (1)]], the server apparatus S2 transmits, to the server apparatus S3, [notification+[transfer+signature (1)]+signature (2)] obtained by adding the transfer notification data and the signature data (2) to [transfer+signature (1)] (T305). In this case, the server apparatus S3 determines based on the signature data (1) that the server apparatus S2, which is the server apparatus after the transfer of the master authority, has transmitted transfer notification data in response to an instruction from the server apparatus S1 which is the server apparatus before the transfer of the master authority.

In the first communication sequence, when the server apparatus S1 does not receive the information request data during the first period P101, the server apparatus S1 transmits the completion notification data depending on the transfer response data to the server apparatus S2 (T013). In this case, when the server apparatus S1 does not receive the information request data during the first period P101, the server apparatus S1 causes the server apparatus S2 to end the second period P103 and to transmit the setting information (3) to the server apparatus S3 (T031).

<Modifications>

While the disclosure has been described in detail with reference to the above aspects thereof, it would be apparent to those skilled in the art that various changes and modifications may be made therein without departing from the scope of the claims.

For example, the above communication system 1 may include a plurality of server apparatuses S3. In this case, the CPU 112 of the server apparatus S2 may transmit, in T005, the transfer notification data to the plurality of server apparatuses S3. The CPUs 113 of each of the plurality of server apparatuses S3 also may transmit the transfer response data to the server apparatus S1 when receiving the transfer notification data from the server apparatus S2. When the CPU 111 of the server apparatus S1 receives the information request data from a specific server apparatus S3 within the first period P101, the CPU 111 may transmit the information request data to the server apparatus S2 after receiving the transfer response data from the specific server apparatus S3 and the first period P101 ends. When the CPU 111 does not receive the information request data within the first period P101, the CPU 111 may transmit the completion notification data to the server apparatus S2 after receiving the transfer response data from all of the plurality of server apparatuses S3.

The information request data (2) transmitted in T109 from the server apparatus S3 to the server apparatus S1 is not limited to a plurality of information request data (2) and may be only one information request data (2). In this case, the CPU 111 of the server apparatus S1 may transmit one received information request data (2) to the server apparatus S2 after the elapse of the first period P101. After the second period P203 elapses, the CPU 112 of the server apparatus S2 may first transmit one setting information (2) corresponding to one information request data (2) to the server apparatus S3, and subsequently transmit, to the server apparatus S3, a plurality of the setting information (3) corresponding to a plurality of the information request data (3) received during the second period P203 in an order of the plurality of information request data (3) has been received.

When the server apparatus S1 receives the plurality of information request data (2) from the server apparatus S3 during the first period P101 (T111), the server apparatus S1 may add information showing the order of the reception of the plurality of information request data (2) to the respective information request data (2) and store the resultant data in the memory 121 (U101). The server apparatus S1 may transmit, to the server apparatus S2, the plurality of information request data (2) to which the information showing the order is added after the first period P101 elapses. In this case, the order of the plurality of information request data (2) transmitted to the server apparatus S2 does not have to be the same as the order in which the plurality of information request data (2) has been received by the server apparatus S1. When the server apparatus S2 receives a plurality of information request data (3) from the server apparatus S3 during the second period P203 (T115), the server apparatus S2 may add information showing an order of the reception of the plurality of information request data (3) to the respective information request data (3) and store the resultant data in the memory 122 (U103).

When the setting information (2) corresponding to each of the plurality of information request data (2) received from the server apparatus S3 during the first period P101 satisfies the particular condition, the server apparatus S1 may transmit the setting information (2) to the server apparatus S3 after a particular time elapses since the reception of the corresponding information request data (2) (T133). Similarly, when the setting information (3) corresponding to each of the plurality of information request data (3) received from the server apparatus S3 during the second period P203 satisfies the particular condition, the server apparatus S2 may transmit the setting information (3) to the server apparatus S3 after a particular time elapses since the reception of the corresponding information request data (3) (T145). That is, the timing at which the setting information is transmitted is not limited to the timing just after the reception of the corresponding information request data. When the server apparatus S1 receives the plurality of information request data (2) from the server apparatus S3 during the first period P101 (T111), the server apparatus S1 may store all of the plurality of the received information request data (2) in the memory 121. When the server apparatus S2 receives the plurality of information request data (3) from the server apparatus S3 during the second period P203 (T115), the server apparatus S2 may store all of the plurality of the received information request data (3) in the memory 122.

When the server apparatus S2 receives the plurality of information request data (4) from the server apparatus S3 after the second period P203 elapses (T131), the server apparatus S2 may transmit the plurality of setting information (4) to the server apparatus S3 after a particular time elapses since the reception of the corresponding information request data (4) (T133). That is, the timing at which the setting information (4) is transmitted is not limited to the timing just after the reception of the corresponding information request data (4).

When the server apparatus S2 receives [[request (2)+signature (3)]+signature (1)] (T219), the server apparatus S2 may transmit, to the server apparatus S3, [setting (2)+[request (2)+signature (3)]+signature (1)]] to which only the setting information (2) is added. That is, the server apparatus S2 does not have to add the signature data (2) to [[request (2)+signature (3)]+signature (1)]. When the server apparatus S2 receives [setting+[transfer+signature (1)]] (T303), the server apparatus S2 may transmit, to the server apparatus S3, [notification+[transfer+signature (1)]] obtained by adding only the transfer notification data to [transfer+signature (1)]. That is, the server apparatus S2 does not have to add the signature data (2) to [transfer+signature (1)].

What is claimed is:

1. A communication method performed by a plurality of server apparatuses configured to control communication among a plurality of terminal apparatuses, the plurality of server apparatuses including a first server apparatus, a second server apparatus, and a third server apparatus different from one another, the first server apparatus having master authority for managing setting information relating to the communication, the communication method comprising:
transmitting a transfer request and the setting information from the first server apparatus to the second server apparatus, the transfer request being for requesting that the master authority is transferred from the first server apparatus to the second server apparatus;
after the second server apparatus receives the transfer request and the setting information, transmitting a transfer notification from the second server apparatus to the third server apparatus directly or through the first server apparatus, the transfer notification being for notifying that the master authority is transferred from the first server apparatus to the second server apparatus;
in response to receiving the transfer notification by the third server apparatus, transmitting a transfer response from the third server apparatus to the first server apparatus;
receiving a first information request from the third server apparatus during a first period that is a period after the first server apparatus transmits the transfer request and the setting information to the second server apparatus and before the first server apparatus receives the transfer response from the third server apparatus;
in response to receiving the transfer response by the first server apparatus, transmitting, after the first period elapses, the first information request from the first server apparatus to the second server apparatus;
receiving a plurality of second information requests transmitted from the third server apparatus during a second period that is a period after the second server apparatus transmits the transfer notification to the third server apparatus and before the second server apparatus receives the first information request from the first server apparatus, and retaining the plurality of second information requests in a received order; and
after the second period elapses, transmitting first setting information corresponding to the first information request from the second server apparatus to the third server apparatus, and subsequently transmitting a plurality of second setting information corresponding to the plurality of second information requests from the second server apparatus to the third server apparatus in an order in which the corresponding plurality of second information requests is retained.

2. The communication method according to claim 1, wherein, when the first server apparatus receives a plurality of first information requests from the third server apparatus during the first period, the first server apparatus retains the plurality of first information requests in a received order in which the plurality of first information requests is received.

3. The communication method according to claim 2, wherein, after the first period elapses, the first server apparatus transmits the plurality of first information requests to the second server apparatus in the received order.

4. The communication method according to claim 3, further comprising:
when the first server apparatus receives the plurality of first information requests from the third server apparatus during the first period, determining, by the first server apparatus, whether each of plurality of the first setting information corresponding to the plurality of first information requests satisfies a particular condition; and
regarding the first information request corresponding to the first setting information determined to satisfy the particular condition, transmitting the first setting information from the first server apparatus to the third server apparatus in response to receiving each of the plurality of first information requests by the first server apparatus, without transmitting the first information request to the second server apparatus after the first period elapses.

5. The communication method according to claim 1, further comprising:
when the second server apparatus receives the plurality of second information requests from the third server apparatus during the second period, determining, by the second server apparatus, whether each of the plurality of second setting information corresponding to the plurality of second information requests satisfies a particular condition; and
regarding the second setting information determined to satisfy the particular condition, transmitting the second setting information from the second server apparatus to the third server apparatus in response to receiving each of the plurality of second information requests by the second server apparatus, without transmitting the second setting information to the third server apparatus after the second period elapses.

6. The communication method according to claim 1, further comprising:
after the second period elapses, receiving, by the second server apparatus, a plurality of third information requests transmitted from the third server apparatus; and
in response to receiving each of the plurality of third information requests by the second server apparatus, transmitting third setting information corresponding to each of the plurality of third information requests from the second server apparatus to the third server apparatus.

7. The communication method according to claim 1, wherein, when the first server apparatus transmits the first information request to the second server apparatus, the first server apparatus transmits first signature information to the second server apparatus, the first signature information being the first information request to which a signature for authentication of the first server apparatus is added; and wherein, in response to receiving the first signature information by the second server apparatus, the second server apparatus transmits the first signature information and the first setting information to the third server apparatus.

8. The communication method according to claim 1, wherein, when the first server apparatus transmits the transfer request and the setting information to the second server apparatus, the first server apparatus transmits second signature information and the setting information to the second server apparatus, the second signature information being the transfer request to which a signature for authentication of the first server apparatus is added; and wherein, in response to receiving the second signature information and the setting information by the second server apparatus, the second server apparatus transmits the second signature information and the transfer notification to the third server apparatus directly or through the first server apparatus.

9. The communication method according to claim 1, further comprising:

in response to not receiving, by the first server apparatus, the first information request during the first period, transmitting a completion notification corresponding to the transfer response from the first server apparatus to the second server apparatus;

receiving, by the second server apparatus, a plurality of second information requests transmitted from the third server apparatus during the second period after the second server apparatus transmits the transfer notification to the third server apparatus and before the second server apparatus receives the completion notification from the first server apparatus, and retaining the plurality of second information requests in a received order; and after the second period elapses, transmitting the plurality of second setting information corresponding to the plurality of second information requests from the second server apparatus to the third server apparatus in an order in which the plurality of second information requests is retained.

10. The communication method according to claim 4, wherein the first server apparatus determines that the particular condition is satisfied when the first setting information corresponding to the first information request is setting information that needs to be responded promptly.

11. A non-transitory computer-readable storage medium storing a communication program executable on a computer of a particular server apparatus in a plurality of server apparatuses configured to control communication among a plurality of terminal apparatuses, the plurality of server apparatuses including a first server apparatus, a second server apparatus serving as the particular server apparatus, and a third server apparatus different from one another, the first server apparatus having master authority for managing setting information relating to the communication, the communication program causing, when executed, the second server apparatus to perform operations comprising:

receiving a transfer request and the setting information transmitted from the first server apparatus, the transfer request being for requesting that the master authority is transferred from the first server apparatus to the second server apparatus;

in response to receiving the transfer request and the setting information, transmitting a transfer notification to the third server apparatus directly or through the first server apparatus, the transfer notification being for notifying that the master authority is transferred from the first server apparatus to the second server apparatus;

when the first server apparatus receives a first information request from the third server apparatus during a first period that is a period after the first server apparatus transmits the transfer request and the setting information to the second server apparatus and before the first server apparatus receives a transfer response from the third server apparatus in response to the transfer notification, receiving a plurality of second information requests transmitted from the third server apparatus during a second period that is a period after the second server apparatus transmits the transfer notification to the third server apparatus and before the second server apparatus receives the first information request from the first server apparatus, and retaining the plurality of second information requests in a received order; and after the second period elapses, transmitting first setting information corresponding to the first information request to the third server apparatus, and subsequently transmitting a plurality of second setting information corresponding to the plurality of second information requests to the third server apparatus in an order in which the corresponding plurality of second information requests is retained.

12. The non-transitory computer-readable storage medium according to claim 11, wherein the communication program further causes, when executed, the second server apparatus to perform operations further comprising:

in response to receiving the plurality of second information requests from the third server apparatus during the second period, determining whether each of the plurality of second setting information corresponding to the plurality of second information requests satisfies a particular condition; and regarding the second setting information determined to satisfy the particular condition, transmitting the second setting information to the third server apparatus in response to receiving each of the plurality of second information requests, without transmitting the second setting information to the third server apparatus after the second period elapses.

13. The non-transitory computer-readable storage medium according to claim 11, wherein the communication program further causes, when executed, the second server apparatus to perform operations further comprising:

after the second period elapses, receiving a plurality of third information requests transmitted from the third server apparatus; and in response to receiving each of the plurality of third information requests, transmitting third setting information corresponding to each of the plurality of third information requests to the third server apparatus.

14. A communication system including a plurality of server apparatuses configured to control communication among a plurality of terminal apparatuses, the plurality of server apparatuses including a first server apparatus, a second server apparatus, and a third server apparatus different from one another, the first server apparatus having master authority for managing setting information relating to the communication, the communication system being configured to perform:

transmitting a transfer request and the setting information from the first server apparatus to the second server apparatus, the transfer request being for requesting that the master authority is transferred from the first server apparatus to the second server apparatus;

after the second server apparatus receives the transfer request and the setting information, transmitting a transfer notification from the second server apparatus to the third server apparatus directly or through the first server apparatus, the transfer notification being for notifying that the master authority is transferred from the first server apparatus to the second server apparatus;

in response to receiving the transfer notification by the third server apparatus, transmitting a transfer response from the third server apparatus to the first server apparatus;

receiving a first information request from the third server apparatus during a first period that is a period after the first server apparatus transmits the transfer request and the setting information to the second server apparatus and before the first server apparatus receives the transfer response from the third server apparatus;

in response to receiving the transfer response by the first server apparatus, transmitting, after the first period elapses, the first information request from the first server apparatus to the second server apparatus;

receiving a plurality of second information requests transmitted from the third server apparatus during a second period that is a period after the second server apparatus transmits the transfer notification to the third server apparatus and before the second server apparatus receives the first information request from the first server apparatus, and retaining the plurality of second information requests in a received order; and after the second period elapses, transmitting first setting information corresponding to the first information request from the second server apparatus to the third server apparatus, and subsequently transmitting a plurality of second setting information corresponding to the plurality of second information requests from the second server apparatus to the third server apparatus in an order in which the corresponding plurality of second information requests is retained.

* * * * *